US012523337B2

(12) United States Patent
Lu

(10) Patent No.: US 12,523,337 B2
(45) Date of Patent: Jan. 13, 2026

(54) LOCKING STRUCTURE FOR TRIPOD HEAD

(71) Applicant: Ningbo Weifeng Intelligent Technology Co., Ltd., Zhejiang (CN)

(72) Inventor: Qi Lu, Ningbo (CN)

(73) Assignee: Ningbo Weifeng Intelligent Technology Co., Ltd., Ningbo (CN)

( * ) Notice: Subject to any disclaimer, the term of this patent is extended or adjusted under 35 U.S.C. 154(b) by 45 days.

(21) Appl. No.: 18/661,827

(22) Filed: May 13, 2024

(65) Prior Publication Data

US 2025/0243965 A1 Jul. 31, 2025

(30) Foreign Application Priority Data

Jan. 30, 2024 (CN) .......................... 202420225425.1

(51) Int. Cl.
*F16M 11/14* (2006.01)
*F16M 11/16* (2006.01)
*G03B 17/56* (2021.01)

(52) U.S. Cl.
CPC ............. *F16M 11/14* (2013.01); *F16M 11/16* (2013.01); *G03B 17/561* (2013.01); *F16M 2200/021* (2013.01)

(58) Field of Classification Search
CPC ............. F16M 11/14; F16M 2200/021; F16M 2200/022; F16M 11/16; F16C 11/0661; F16B 2/18; F16B 2/185
USPC ...... 248/179.1, 371, 418; 403/125; 269/230, 269/75
See application file for complete search history.

(56) References Cited

U.S. PATENT DOCUMENTS 898,391 A * 9/1908 Peterson ............. F16C 11/0661
403/90
1,288,461 A * 12/1918 Akelley ................. F16M 11/14
269/230
1,349,002 A * 8/1920 Lakin ..................... F16M 11/14
403/125
(Continued)

*Primary Examiner* — Christopher Garft
(74) *Attorney, Agent, or Firm* — Wang Law Firm, Inc.

(57) ABSTRACT

A locking structure for a tripod head is provided. The locking structure for a tripod head includes a base. The base is provided with a lower ball seat and an upper ball seat. A gap is formed between the lower ball seat and the upper ball seat. A cambered surface structure of a supporting ball seat is placed in the gap. The supporting ball seat and the lower ball seat, and the supporting ball seat and the upper ball seat are in contact through cambered surfaces. The base is provided with an adjusting block and a top block. The side of the top block is provided with a protruding bump, and the adjusting block is arranged on the outer side of the bump and abuts against the bump. The outer side of the adjusting block is provided with an operating piece, and the operating piece is used for exerting extrusion force on the adjusting block. The top block is located at the lower part of the lower ball seat. The bottom of the lower ball seat is provided with a downward protruding abutting block. The abutting block and the top block are abutted through an inclined plane. When the top block moves due to the extrusion force of the adjusting block, the lower ball seat can be pushed to move up. The operation of locking the tripod head can be carried out through a plate buckle, and the locking force can be adjusted, so that the operation is convenient, and the structure is simple.

8 Claims, 5 Drawing Sheets

(56) References Cited

U.S. PATENT DOCUMENTS

| | | | | |
|---|---|---|---|---|
| 4,591,123 A | * | 5/1986 | Bradshaw | H04N 5/64 |
| | | | | 248/371 |
| 2006/0022102 A1 | * | 2/2006 | Dittmer | F16M 11/2014 |
| | | | | 248/276.1 |
| 2020/0000217 A1 | * | 1/2020 | Kojima | A47B 13/003 |
| 2021/0348711 A1 | * | 11/2021 | Kuriyama | F16M 11/242 |

* cited by examiner

LOCKING STRUCTURE FOR TRIPOD HEAD

TECHNICAL FIELD

The present disclosure belongs to the technical field of photography and video recording auxiliary equipment, in particular to a locking structure for a tripod head.

BACKGROUND

The tripod head, as a commonly used structure used on the support, is used for keep cameras, mobile phones and other equipment stable, and can rotate in multiple directions. The locking structure is a part of the tripod head, and is used for fixing equipment at a specific position or posture so as to prevent accidental movement or vibration. Generally, the locking structure is usually realized by screws, pliers or other mechanical devices. The locking structure plays a key role in the tripod head, thus ensuring the stability and accuracy of the equipment.

In the prior art, the locking structure for some tripod heads is complicated in operation, poor in adjustability and insufficient in firmness after locking, and improvements are needed. Further research has been made in this application.

SUMMARY

Aiming the disadvantages in the prior art, the present disclosure provides a locking structure for a tripod head. The operation for locking the tripod head can be carried out conveniently through the plate buckle, and the locking force can be adjusted, so that the operation is convenient, and the structure is simple.

The present disclosure is solved through the following technical scheme.

A locking structure for a tripod head is provided. The locking structure for a tripod head includes a base. The base is provided with a lower ball seat and an upper ball seat. A gap is formed between the lower ball seat and the upper ball seat. A cambered surface structure of a supporting ball seat is placed in the gap. The supporting ball seat and the lower ball seat, and the supporting ball seat and the upper ball seat are in contact through cambered surfaces. The base is provided with an adjusting block and a top block. The side of the top block is provided with a protruding bump, and the adjusting block is arranged on the outer side of the bump and abuts against the bump. The outer side of the adjusting block is provided with an operating piece, and the operating piece is used for exerting extrusion force on the adjusting block. The top block is located at the lower part of the lower ball seat. The bottom of the lower ball seat is provided with a downward protruding abutting block. The abutting block and the top block are abutted through an inclined plane. When the top block moves due to the extrusion force of the adjusting block, the lower ball seat can be pushed to move up.

according to the locking structure for a tripod head in this application, the supporting ball seat is provided with a top disc for mounting other structures. The supporting ball seat is arranged between the upper ball seat and the lower ball seat in arc contact, so the supporting ball seat can freely rotate within a certain angle, and the function of attitude adjustment of the tripod head is realized. When locking is needed, the adjusting block is extruded by the operating piece, and the bump is extruded by the adjusting block so that the top block moves horizontally. During the movement of the top block, the abutting block moves up through the inclined plane, and then the lower ball seat moves up, so that extrusion on the supporting ball seat is realized, the locking function is realized, and the operation is convenient.

In an optimized embodiment, the base is provided with a central structural part. The upper ball seat is limited on the central structural part, so that the assembly structure is compact. The supporting ball seat can be locked between the upper ball seat and the lower ball seat by moving up the lower ball seat.

In an optimized embodiment, the central structural part includes a mounting seat arranged on the base and a central column arranged on the mounting seat. The central column can be a bolt. A boss of the upper ball seat is clamped between the mounting seat and the central column. The installation and disassembly are convenient, and the installation of the upper ball seat can be well realized.

In an optimized embodiment, the bottom of the lower ball seat is provided with two symmetrically arranged abutting blocks, and the top block is provided with two second abutting blocks corresponding to the abutting blocks. The abutting block is provided with an inclined plane. The second abutting block is provided with a second inclined plane. The inclined plane abuts against the second inclined plane and is used for converting the horizontal movement of the lower ball seat into the vertical movement of the lower ball seat. The structure is compact, the operation is convenient, and the stability is high.

In an optimized embodiment, the inner side of the top block is provided with an elastic part for resetting. The elastic part can be a spring, abuts against the mounting seat, and is used for resetting the top block after force release.

In an optimized embodiment, the operating piece is a plate buckle. An inner end of the plate buckle is rotatably arranged on the base through a rotating shaft and is of an eccentric structure. The extrusion force can be exerted on the adjusting block through rotation. The operation is labor-saving and convenient.

In an optimized embodiment, an accommodating slot which can accommodate the folded plate buckle is formed in an outer wall of the base. The integral structure is compact and attractive in appearance after the plate buckle is folded.

In an optimized embodiment, the base is provided with an inner boss, and the lower ball seat is assembled on the inner boss.

In an optimized embodiment, the base is provided with an adjusting piece. The adjusting piece acts on the adjusting block to limit the adjusting block. The adjusting block and the bump are abutted through an inclined plane. In the structure, the abutted inclined plane between the adjusting block and the bump can be moved to adjust the relative positions of the adjusting block and the bump, so that adjustment on integral locking force is realized.

In an optimized embodiment, the adjusting piece is arranged in an adjusting hole in the base, and the adjusting piece directly or indirectly abuts against one end of the adjusting block. The adjusting piece can be a threaded screw in the adjusting hole.

Compared with the prior art, the present disclosure has the following beneficial effects. A locking structure for a tripod head is provided. With an extrusion locking method of a unique structure, the operation for locking the tripod head can be carried out conveniently through the plate buckle, and the locking force can be adjusted, so that the operation is convenient, and the structure is simple.

DETAILED DESCRIPTION OF THE EMBODIMENTS

The present disclosure is further described in detail in conjunction with the attached figures and embodiments.

In the following embodiments, the same or similar reference mark numbers indicate the same or similar elements or elements with the same or similar functions. The embodiments described below by reference to the attached figures are exemplary only for explaining the present disclosure and are not to be construed as limiting the present disclosure.

In the description of the present disclosure, it needs to be illustrated that the indicative direction or position relations of the terms such as "center", "longitudinal", "transverse", "length", "width", "thickness", "upper", "lower", "front", "rear", "left", "right", "vertical", "horizontal", "top", "bottom", "inside", "outside", "clockwise" and "counterclockwise" are direction or position relations illustrated based on the attached figures, just for facilitating the description of the present disclosure and simplifying the description, and the terms cannot be understood as the restriction of the present disclosure. In addition, the terms "first" and "second" are merely intended for a purpose of description, and shall not be understood as an indication or implication of relative importance or implicit indication of the number of indicated technical features. In the description of the present disclosure, it needs to be illustrated that, except as otherwise noted, the terms such as "install", "link" and "connect" should be generally understood. For those skilled in the art, the specific meanings of the terms in the present disclosure can be understood according to specific conditions.

Figure 1:
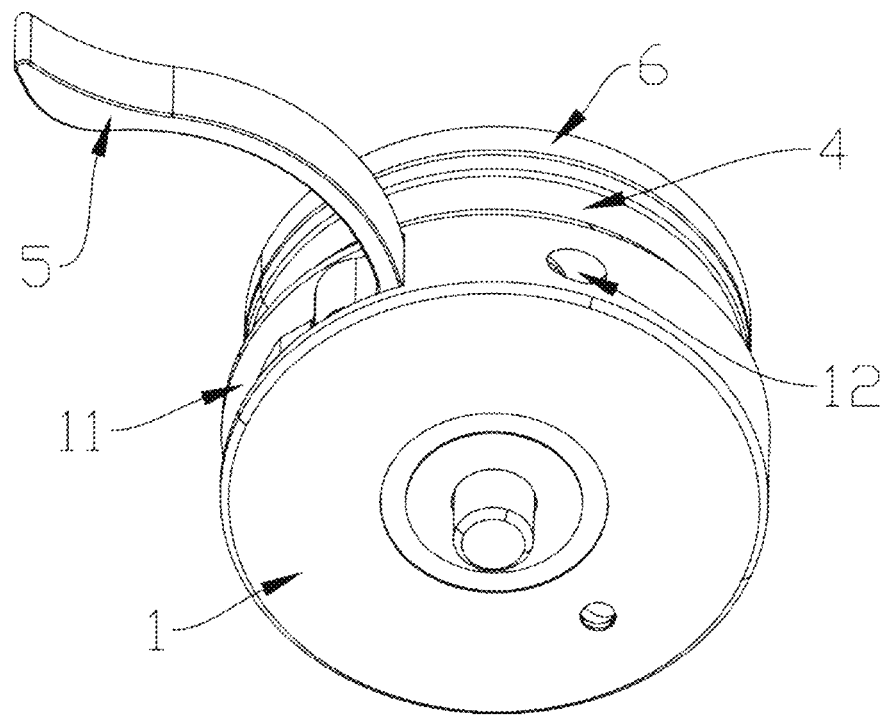
FIG. 1 is a first space diagram of a locking structure for a tripod head in this application.
Figure 2:
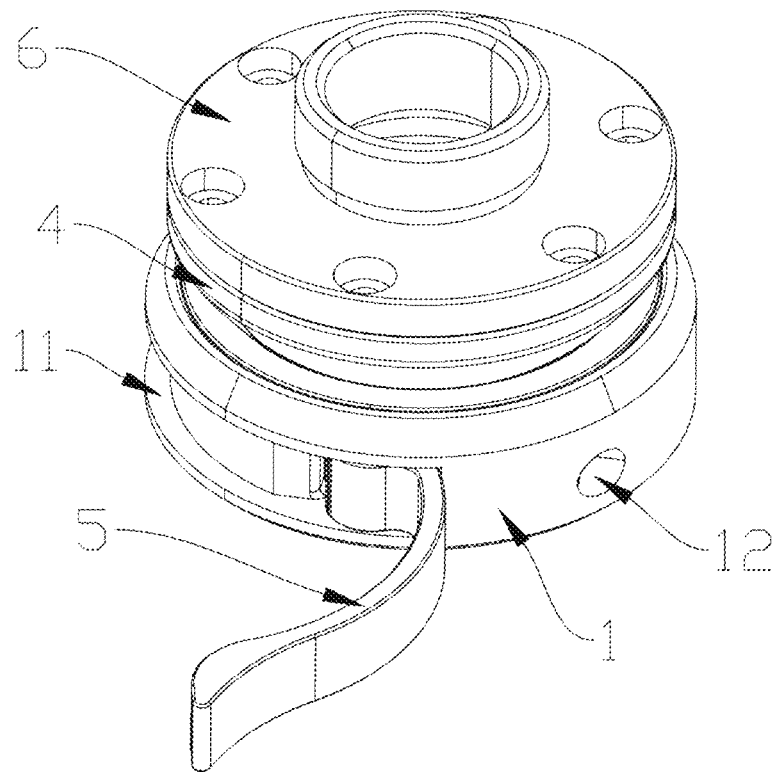
FIG. 2 is a second space diagram of a locking structure for a tripod head in this application.
Figure 3:
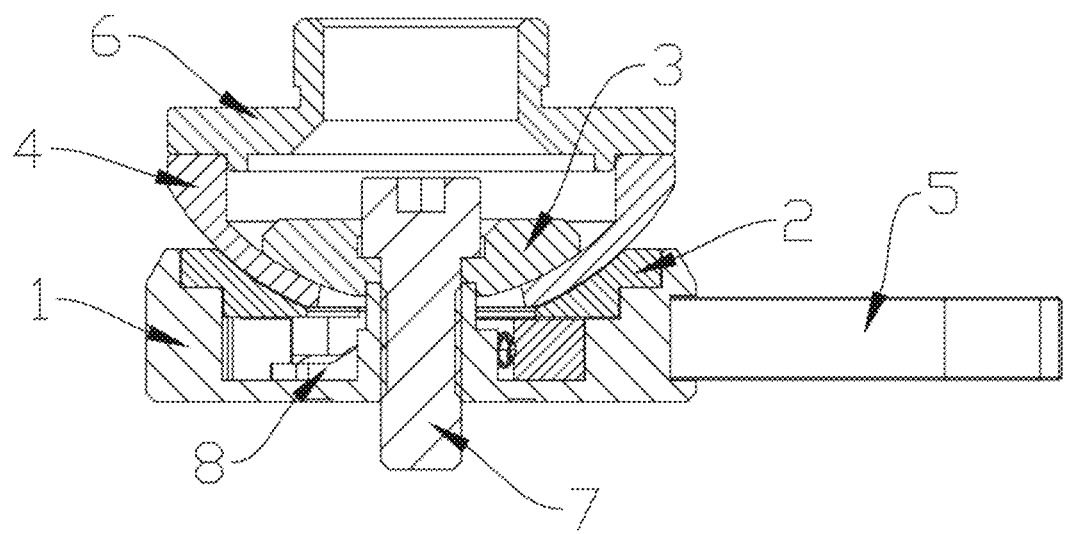
FIG. 3 is a section view of a locking structure for a tripod head in this application.
Figure 4:
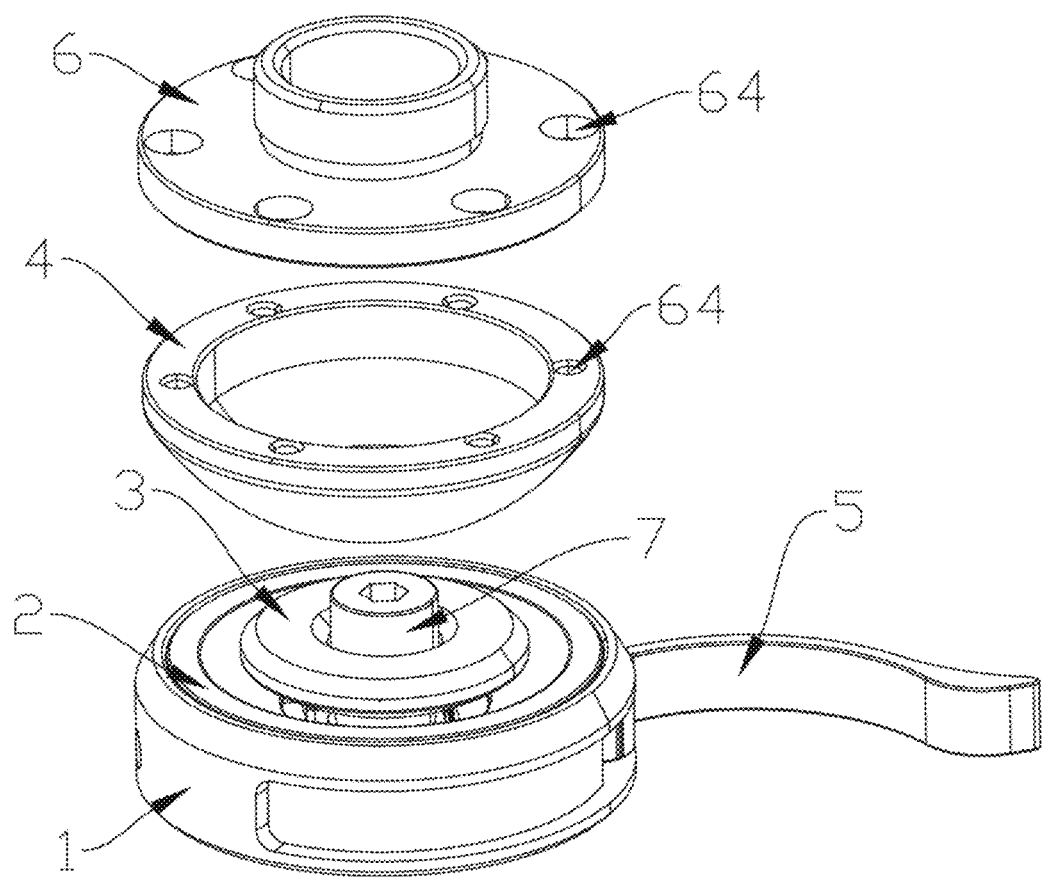
FIG. 4 is an assembly diagram of a locking structure for a tripod head in this application.
Figure 5:
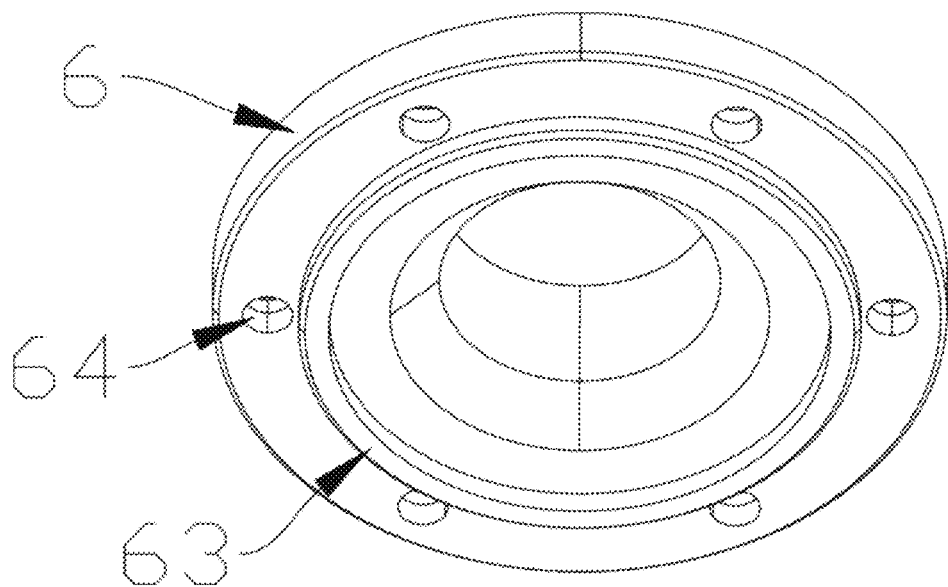
FIG. 5 is a space diagram of a top disc in a locking structure for a tripod head in this application.
Figure 6:
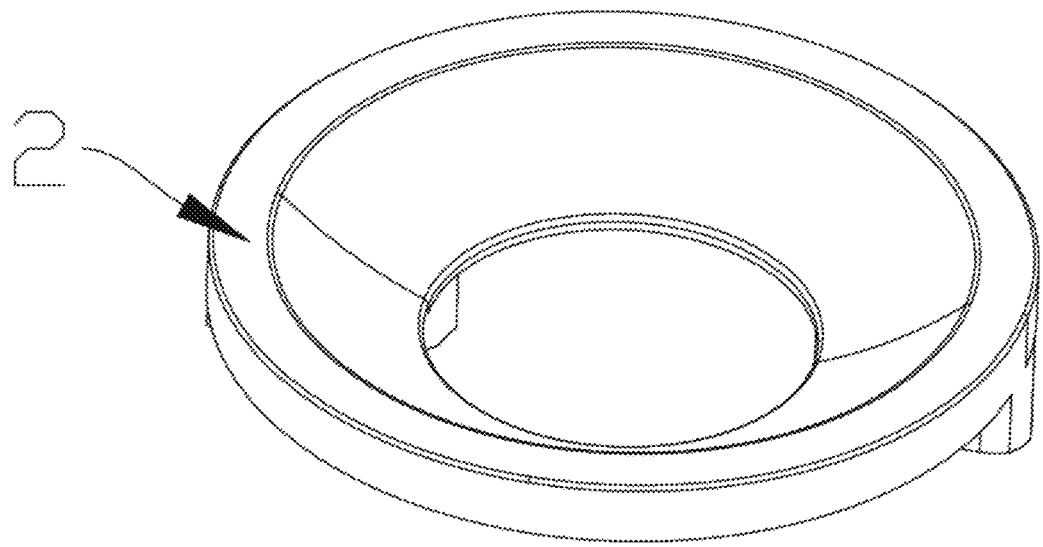
FIG. 6 is a first space diagram of a lower ball seat in a locking structure for a tripod head in this application.
Figure 7:
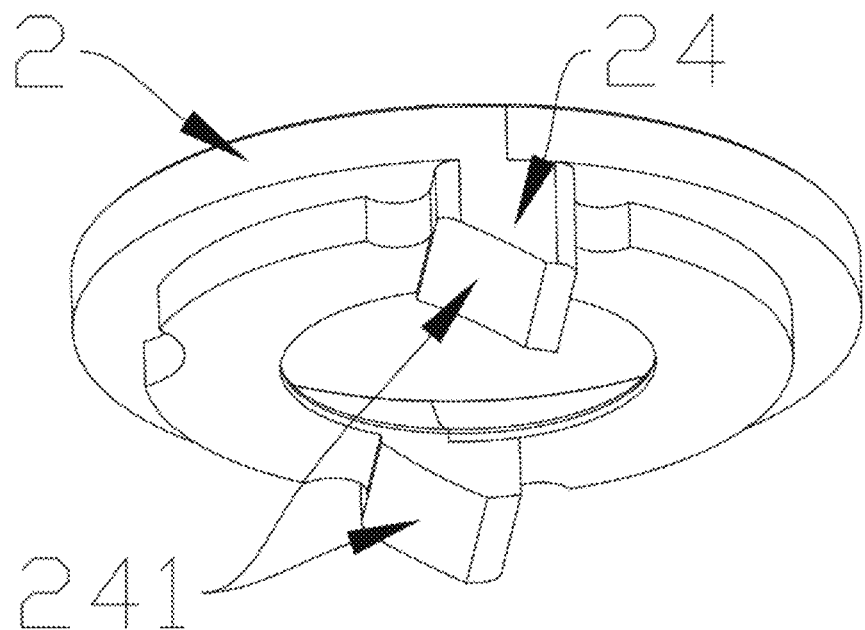
FIG. 7 is a second space diagram of a lower ball seat in a locking structure for a tripod head in this application.
Figure 8:
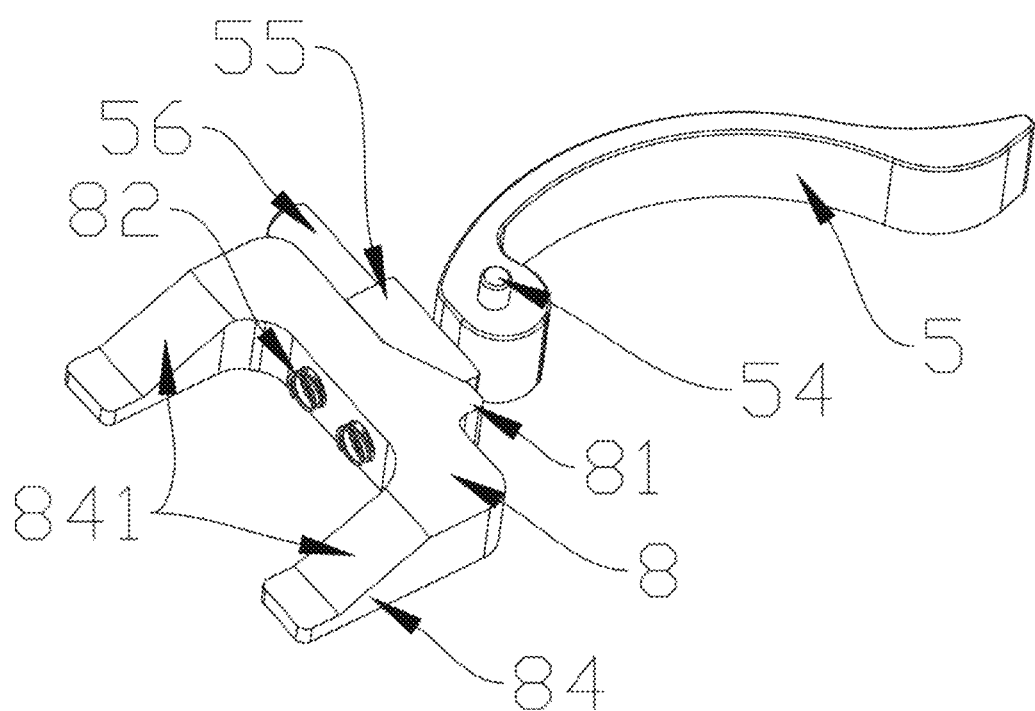
FIG. 8 is a space diagram that a top block is matched with an operating piece in a locking structure for a tripod head in this application.
Figure 9:
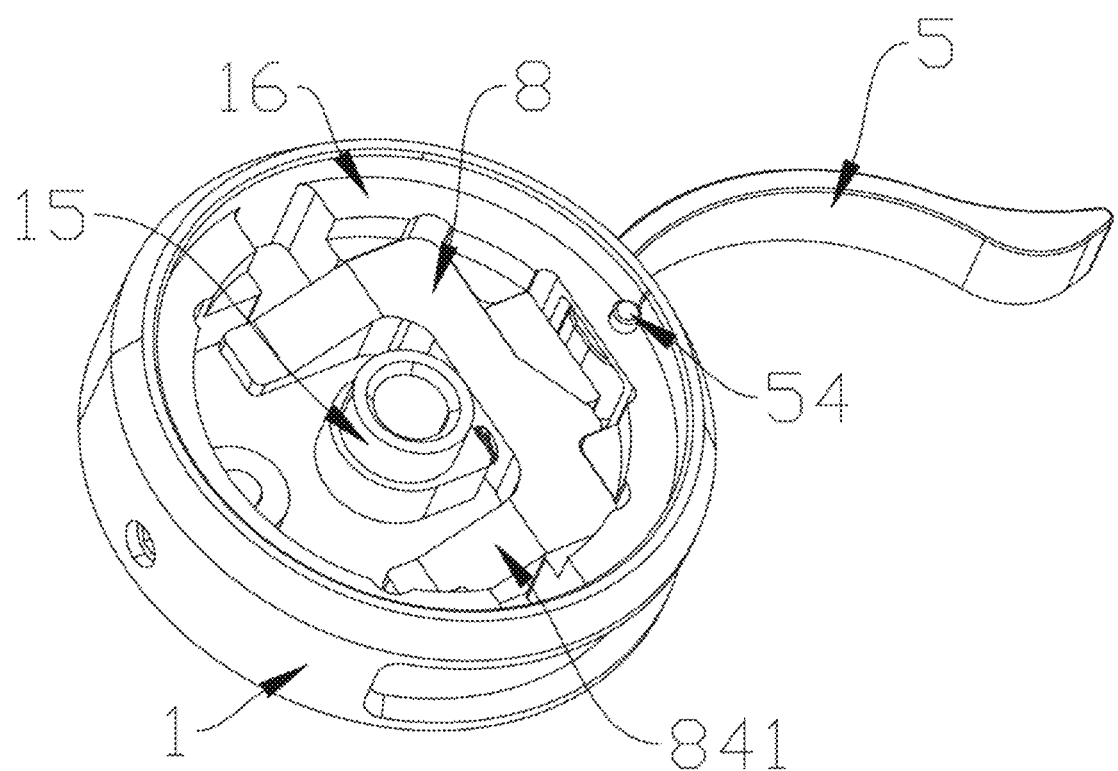
FIG. 9 is a space diagram of a base and a structure thereof in a locking structure for a tripod head in this application.
Figure 10:
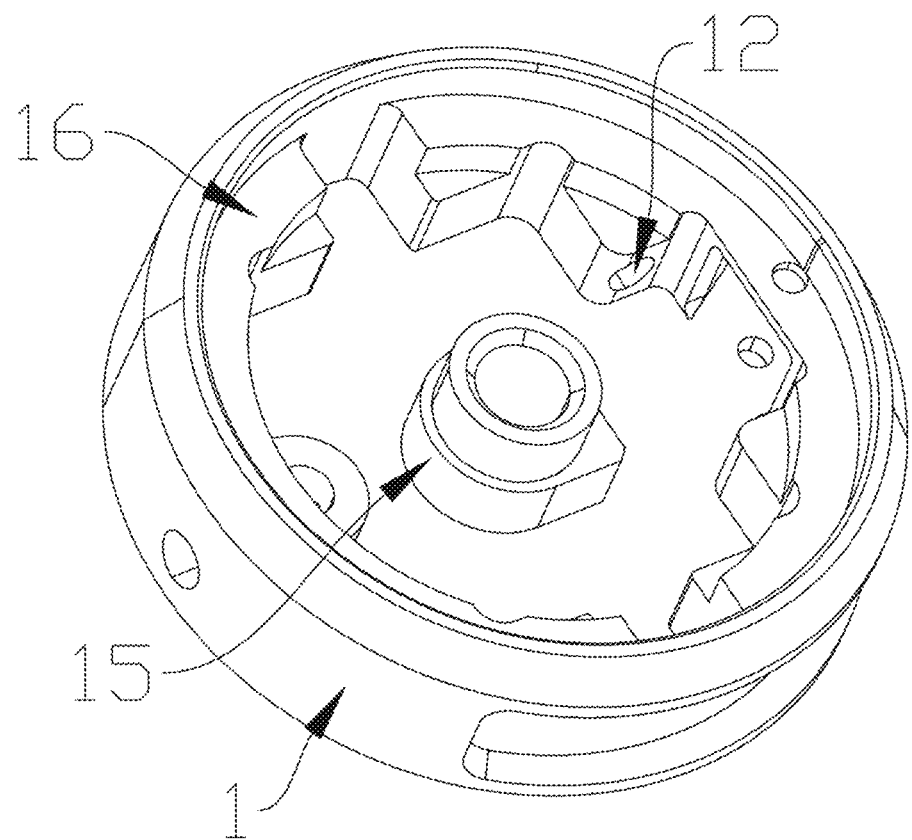
FIG. 10 is a space diagram of a base in a locking structure for a tripod head in this application.

Referring to FIG. 1 to FIG. 10, A locking structure for a tripod head is provided. The locking structure for a tripod head includes a base 1. The base 1 is provided with a lower ball seat 2 and an upper ball seat 3. A gap is formed between the lower ball seat 2 and the upper ball seat 3. A cambered surface structure of a supporting ball seat 4 is placed in the gap. The supporting ball seat 4 and the lower ball seat 2, and the supporting ball seat 4 and the upper ball seat 3 are in contact through cambered surfaces. The base 1 is provided with an adjusting block 55 and a top block 8. The side of the top block 8 is provided with a protruding bump 81, and the adjusting block 55 is arranged on the outer side of the bump 81 and abuts against the bump 81. The outer side of the adjusting block 55 is provided with an operating piece 5, and the operating piece 5 is used for exerting extrusion force on the adjusting block 55. The top block 8 is located at the lower part of the lower ball seat 2. The bottom of the lower ball seat 2 is provided with a downward protruding abutting block 24. The abutting block 24 and the top block 8 are abutted through an inclined plane. When the top block 8 moves due to the extrusion force of the adjusting block 55, the lower ball seat 2 can be pushed to move up.

In addition, seen from the attached figures, in this application, the base 1 is provided with a central structural part. The upper ball seat 3 is limited on the central structural part, so that the assembly structure is compact. The supporting ball seat 4 can be locked between the upper ball seat 3 and the lower ball seat 2 by moving up the lower ball seat 2. Specifically, the central structural part includes a mounting seat 15 arranged on the base 1 and a central column 7 arranged on the mounting seat 15. The central column 7 can be a bolt. A boss of the upper ball seat 3 is clamped between the mounting seat 15 and the central column 7. The installation and disassembly are convenient, and the installation of the upper ball seat 3 can be well realized.

In this application, the bottom of the lower ball seat 2 is provided with two symmetrically arranged abutting blocks 24, and the top block 8 is provided with two second abutting blocks 84 corresponding to the abutting blocks 24. The abutting block 24 is provided with an inclined plane 241. The second abutting block 84 is provided with a second inclined plane 841. The inclined plane 241 abuts against the second inclined plane 841 and is used for converting the horizontal movement of the lower ball seat 2 into the vertical movement of the lower ball seat 2. The structure is compact, the operation is convenient, and the stability is high. The inner side of the top block 8 is provided with an elastic part 82 for resetting. The elastic part 82 can be a spring, abuts against the mounting seat 15, and is used for resetting the top block 8 after force release.

In an embodiment of this application, the operating piece 5 is a plate buckle. An inner end of the plate buckle is rotatably arranged on the base 1 through a rotating shaft 54 and is of an eccentric structure. The extrusion force can be exerted on the adjusting block 55 through rotation. The operation is labor-saving and convenient. Moreover, an accommodating slot 11 which can accommodate the folded plate buckle is formed in an outer wall of the base 1. The integral structure is compact and attractive in appearance after the plate buckle is folded.

In this application, the base 1 is provided with an inner boss 16, and the lower ball seat 2 is assembled on the inner boss 16. Moreover, the base 1 is provided with an adjusting piece 56. The adjusting piece 56 acts on the adjusting block 55 to limit the adjusting block 55. The adjusting block 55 and the bump 81 are abutted through an inclined plane. In the structure, through the extrusion of the adjusting piece 56, the abutted inclined plane between the adjusting block 55 and the bump 81 can be moved to adjust the relative positions of the adjusting block 55 and the bump 81, so that adjustment on integral locking force is realized. In specific schemes, the adjusting piece 56 is arranged in an adjusting hole 12 in the base 1, and the adjusting piece 56 directly or indirectly abuts against one end of the adjusting block 55. The adjusting piece 56 can be a threaded screw in the adjusting hole 12.

In the locking structure for a tripod head in this application, the supporting ball seat 4 is provided with a top disc 6, and a matched screw hole 64 is formed between the supporting ball seat 4 and the top disc 6. Through bolt assembly, the lower part of the top disc 6 is provided with a positioning flange 63. The top disc 6 is used for mounting other structures. The supporting ball seat 4 is arranged between the upper ball seat 3 and the lower ball seat 2 in arc contact, so the supporting ball seat 4 can freely rotate within a certain angle, and the function of attitude adjustment of the tripod head is realized. When locking is needed, the adjusting block 55 is extruded by the operating piece 5, and the bump 81 is extruded by the adjusting block 55 so that the top block 8 move horizontally. During the movement of the top block 8, the abutting block 24 moves up through the inclined plane, and then the lower ball seat 2 moves up, so that extrusion on the supporting ball seat 4 is realized, the locking function is realized, and the operation is convenient. Moreover, the locking force can be adjusted through the extrusion of the adjusting piece 56 so as to meet the requirements of actual use scenarios.

In conclusion, the present disclosure provides a locking structure for a tripod head. With an extrusion locking method of a unique structure, the operation for locking the tripod head can be carried out conveniently through the plate buckle, and the locking force can be adjusted, so that the operation is convenient, and the structure is simple.

The scope of protection in the present disclosure includes but is not limited to the above-mentioned embodiments. The scope of protection in the present disclosure is subject to the claims, and any substitution, deformation and improvement easily thought of by those skilled in the art fall within the scope of protection in the present disclosure.

The invention claimed is:

1. A locking structure for a tripod head, wherein the locking structure comprises a base (1), the base (1) is provided with a lower ball seat (2) and an upper ball seat (3), a gap is formed between the lower ball seat (2) and the upper ball seat (3), a cambered surface structure of a supporting ball seat (4) is placed in the gap, and the supporting ball seat (4) and the lower ball seat (2), and the supporting ball seat (4) and the upper ball seat (3) are in contact through cambered surfaces;

the base (1) is provided with an adjusting block (55) and a top block (8), the side of the top block (8) is provided with a protruding bump (81), and the adjusting block (55) is arranged on the outer side of the bump (81) and abuts against the bump (81); the outer side of the adjusting block (55) is provided with an operating piece (5), and the operating piece (5) is used for exerting extrusion force on the adjusting block (55);

the top block is located at the lower part of the lower ball seat (2), the bottom of the lower ball seat (2) is provided with a downward protruding abutting block (24), the abutting block (24) and the top block (8) are abutted through an inclined plane, and when the top block (8) moves due to the extrusion force of the adjusting block (5), the lower ball seat (2) can be pushed to move up;

the base (1) is provided with a central structural part, the central structural part comprises a mounting seat (15) arranged on the base (1) and a central column (7) arranged on the mounting seat (15), and the upper ball seat (3) is limited on the central structural part.

2. The locking structure for a tripod head according to claim 1, wherein the bottom of the lower ball seat (2) is provided with two symmetrically arranged abutting blocks (24), and the top block (8) is provided with two second abutting blocks (84) corresponding to the abutting blocks (24); the abutting block (24) is provided with an inclined plane (241), the second abutting block (84) is provided with a second inclined plane (841), and the inclined plane (241) abuts against the second inclined plane (841) and is used for converting the horizontal movement of the lower ball seat (2) into the vertical movement of the lower ball seat (2).

3. The locking structure for a tripod head according to claim 1, wherein the inner side of the top block (8) is provided with an elastic part (82) for resetting.

4. The locking structure for a tripod head according to claim 1, wherein the operating piece (5) is a plate buckle, an inner end of the plate buckle is rotatably arranged on the base (1) through a rotating shaft (54) and is of an eccentric structure, and extrusion force can be exerted on the adjusting block (55) through rotation.

5. The locking structure for a tripod head according to claim 4, wherein an accommodating slot (11) which can accommodate the folded plate buckle is formed in an outer wall of the base (1).

6. The locking structure for a tripod head according to claim 1, wherein the base (1) is provided with an inner boss (16), and the lower ball seat (2) is assembled on the inner boss (16).

7. The locking structure for a tripod head according to claim 1, wherein the base (1) is provided with an adjusting piece (56), the adjusting piece (56) acts on the adjusting block (55) to limit the adjusting block (55), and the adjusting block (55) and the bump (81) are abutted through an inclined plane.

8. The locking structure for a tripod head according to claim 7, wherein the adjusting piece (56) is arranged in an adjusting hole (12) in the base (1), and the adjusting piece (56) directly or indirectly abuts against one end of the adjusting block (55).

* * * * *